(12) United States Patent
Olsson et al.

(10) Patent No.: US 12,313,966 B1
(45) Date of Patent: *May 27, 2025

(54) VIDEO PIPE INSPECTION SYSTEMS

(71) Applicant: SeeScan, Inc., San Diego, CA (US)

(72) Inventors: Mark S. Olsson, La Jolla, CA (US); Eric M. Chapman, Lake Tapps, WA (US); Allen W. Tucker, San Diego, CA (US); Dawn E. Shaffer, San Diego, CA (US)

(73) Assignee: SEESCAN, INC., San Diego, CA (US)

( * ) Notice: Subject to any disclaimer, the term of this patent is extended or adjusted under 35 U.S.C. 154(b) by 844 days.

This patent is subject to a terminal disclaimer.

(21) Appl. No.: 17/182,113

(22) Filed: Feb. 22, 2021

Related U.S. Application Data

(63) Continuation of application No. 14/033,349, filed on Sep. 20, 2013, now Pat. No. 10,935,880, which is a continuation of application No. 12/658,939, filed on Feb. 16, 2010, now Pat. No. 8,540,429, which is a continuation-in-part of application No. 12/371,540, filed on Feb. 13, 2009, now Pat. No. 8,289,385.

(51) Int. Cl.
*G03B 37/00* (2021.01)
*F16L 57/06* (2006.01)
*G01N 21/954* (2006.01)

(52) U.S. Cl.
CPC ............ *G03B 37/005* (2013.01); *F16L 57/06* (2013.01); *G01N 21/954* (2013.01); *G01N 2021/9542* (2013.01)

(58) Field of Classification Search
CPC .................. F16L 57/06; G01N 21/954; G01N 2021/9542; G03B 37/005

USPC ........................................................ 73/865.8
See application file for complete search history.

(56) References Cited

U.S. PATENT DOCUMENTS

| | | | |
|---|---|---|---|
| 3,764,779 A | 10/1973 | Kadoya et al. | |
| 3,980,808 A | 9/1976 | Kikuchi et al. | |
| 4,607,925 A | 8/1986 | Kamigaichi | |
| 5,084,764 A | 1/1992 | Day | |
| 5,122,622 A | 6/1992 | Reuss et al. | |
| 5,195,392 A | 3/1993 | Moore et al. | |
| 5,408,560 A | 4/1995 | Seynhaeve et al. | |
| 5,457,288 A | 10/1995 | Olsson | |
| 5,519,173 A | 5/1996 | Newmoyer et al. | |
| 5,808,239 A | 9/1998 | Olsson | |
| 5,899,795 A * | 5/1999 | Penza | B24B 5/40 451/61 |
| 5,939,679 A | 8/1999 | Olsson | |
| 5,996,159 A | 12/1999 | Irwin | |

(Continued)

FOREIGN PATENT DOCUMENTS

| | | | |
|---|---|---|---|
| CH | 690338 A5 * | 7/2000 | .......... F16L 25/0045 |
| GB | 2172079 A | 9/1986 | |
| WO | WO-2006127095 A1 * | 11/2006 | .......... B08B 9/0436 |

OTHER PUBLICATIONS

International Searching Authority. "Written Opinion of the International Searching Authority" for PCT Patent Application No. PCT/IB2010/000310, Aug. 13, 2011, European Patent Office, Munich.

*Primary Examiner* — Daniel S Larkin
*Assistant Examiner* — Nashmiya S Fayyaz
(74) *Attorney, Agent, or Firm* — Steven C. Tietsworth, Esq.; Michael J. Pennington, Esq.

(57) ABSTRACT

A video pipe inspection system may include a push-cable, camera head, and/or pipe guide.

12 Claims, 11 Drawing Sheets

(56) References Cited

U.S. PATENT DOCUMENTS

| | | |
|---|---|---|
| 6,111,600 A | 8/2000 | McLeod et al. |
| 6,545,704 B1 | 4/2003 | Olsson et al. |
| 6,820,653 B1 | 11/2004 | Schempf et al. |
| 6,831,679 B1 | 12/2004 | Olsson et al. |
| 6,862,945 B2 | 3/2005 | Chapman et al. |
| 6,958,767 B2 | 10/2005 | Olsson et al. |
| 2003/0142207 A1* | 7/2003 | Olsson ............... H04N 7/185 348/84 |
| 2004/0083829 A1* | 5/2004 | Chapman .......... G01N 21/8806 73/865.8 |
| 2005/0165275 A1* | 7/2005 | Von Felten ........ G02B 23/2476 600/140 |
| 2008/0092672 A1 | 4/2008 | Gibson et al. |

\* cited by examiner

VIDEO PIPE INSPECTION SYSTEMS

CROSS-REFERENCE TO RELATED APPLICATIONS

This application is a continuation of and claims priority to co-pending U.S. Utility patent application Ser. No. 14/033,349, entitled VIDEO PIPE INSPECTION SYSTEMS WITH SNAP-ON PIPE GUIDES, filed Sep. 20, 2013, which is a continuation of and claims priority to U.S. Utility patent application Ser. No. 12/658,939, now U.S. Pat. No. 8,540,429, entitled SNAP-ON PIPE GUIDE, filed Feb. 16, 2010, which is a continuation-in-part of and claims priority to U.S. Utility patent application Ser. No. 12/371,540, now U.S. Pat. No. 8,289,385, entitled PUSH-CABLE FOR PIPE INSPECTION SYSTEM, filed Feb. 13, 2009. The content of each of these applications is incorporated by reference herein in its entirety for all purposes.

FIELD

This disclosure relates generally to systems for inspecting the interior of pipes, conduits, or other cavities. More specifically, but not exclusively, this disclosure relates to pipe inspection systems using push-cables and camera heads with snap-on pipe guides.

BACKGROUND

Long lengths of hidden or buried pipe frequently require inspection for diagnosis or repair. Examples are sewage lines, gas and water lines and cable conduits. Pipes or conduits requiring inspection may often have small diameters of six inches or less, and may make sharp turns or have internal joining, for example, which make the progress of a pipe inspection camera through the pipe or conduit difficult.

A pipe inspection camera head that is coupled to the distal end of a push-cable and that that is jammed a significant distance down a pipe can be difficult to un-lodge, adding time and cost to the inspection. Additionally, it is desirable to keep the camera head of a pipe inspection system raised above the bottom of the pipe to avoid fouling or obscuring it with sludge, water, or debris. To this end, pipe guides using various designs have been developed. See, for example, U.S. Pat. No. 6,862,945 granted Mar. 8, 2005 to Eric Chapman et al.

Pipe guides in the existing art often are built of multiple parts requiring intricate assembly, and may be awkward or difficult to attach to an inspection system.

Accordingly, there is a need in the art to address the above-described as well as other problems in the art.

SUMMARY

This disclosure relates generally to systems for inspecting the interior of pipes, conduits, or other cavities. More specifically, but not exclusively, this disclosure relates to pipe inspection systems using push-cables and camera heads with snap-on pipe guides.

In accordance with one aspect, a pipe guide may include a pair of shells, which may be cylindrical, with the shells each having a plurality of radially extending circumferentially spaced vanes, and structure for holding the shells together when the shells are axially mated end-to-end. A pair of curved tab arms may extend circumferentially about corresponding ones of the cylindrical shells.

A pair of slide-locks may be configured to slide over corresponding ones of the tab arms to move them into a locking position, where keys on the tab arms may extend between adjacent coils of a coil spring surrounded by the shells.

Various additional aspects, features, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Embodiments of the present invention provide a pipe guide that is more easily assembled, attached and removed around the spring that extends rearwardly from a camera head in a video pipe inspection system. In this type of system a termination assembly mechanically connects the fiberglass rod of a flexible resilient push-cable to the camera head and also electrically connects wires in the cable to the electronic circuitry inside the camera head. An elongate stainless steel coil spring surrounds the terminal segment of the push-cable. The forward end of the spring is connected to the rearward end of the camera head. The spring provides a means for matching the mechanical impedance of the rigid camera head to t]) e push-cable. The spring absorbs the stresses of the shocks, bends and twists that might otherwise lead to breakage of the electrical connections.

Figure 1:
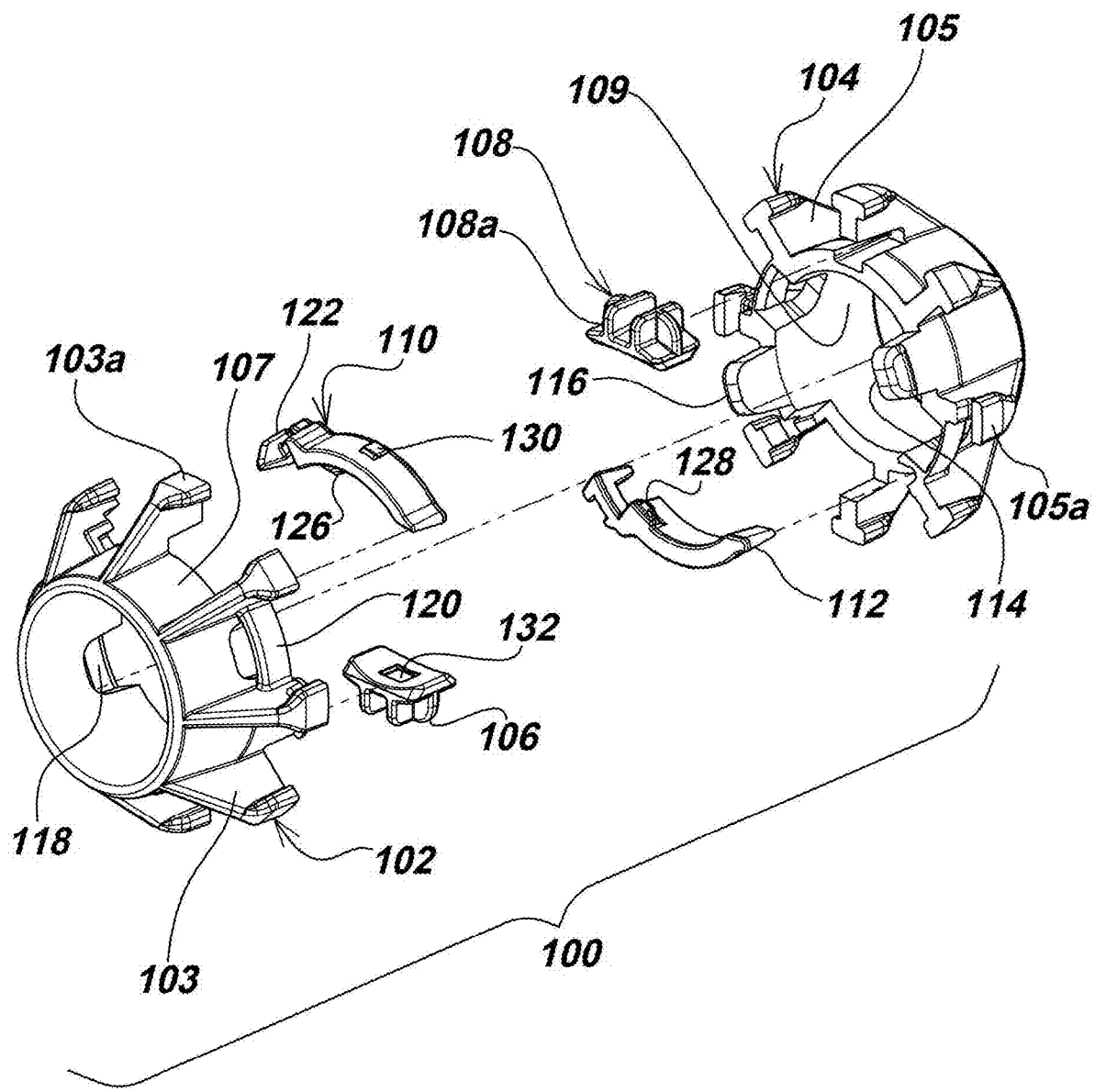
FIG. 1 is an exploded isometric view of a pipe guide in accordance with an embodiment of the present invention.

Referring to FIG. 1, in accordance with an embodiment of the present invention, a pipe guide 100 comprises two groups of three parts in each group. Each group forms a half of the pipe guide 100 and includes a cylindrical shell 102, 104 a tab arm 110, 112 and a slide-lock 106, 108. When assembled these parts form two mirror-image halves that can be readily snapped together around the spring 304 (FIG. 9)

of a pipe inspection system. One half of the pipe guide 100 (FIG. 2) is turned to face the other and rotationally offset by one-eighth of a turn. The two halves then lock together to produce the assembled pipe guide 100 (FIG. 3). The components of the pipe guide 100 are preferably injection molded out of suitable plastic.

Each shell 102, 104 (FIG. 1) has eight substantially identical vanes 103, 105 that extend radially outwardly from its surface. These generally triangular vanes 103, 105 provide tapered frontal edges on the forward end of the pipe guide 100 that facilitate insertion of the camera head down the pipe. The vanes 103, 105 are advantageously formed with skids 103a and 105a on the outer ends thereof which have flat radial surfaces that engage the interior wall of the pipe and provide better stability and increased wear resistance. The vanes 103, 105 extend axially and are equally circumferentially spaced around the corresponding inner cylindrical portions 107, 109 of the shells 102, 104, respectively.

Two lock tongues 114, 116 (FIG. 1) extend axially from the perimeters of each of the shells 102, 104. The shells 102, 104 also each have two formed catches IO 118, 120 (FIGS. 1 and 7) that provide recesses for receiving and engaging the lock tongues 114, 116 that extend from the opposite shell. Each of the catches 118, 120 is formed as a circumferentially extending rib. The act of engaging the lock tongues 114, 116 into their opposite-side recesses under the catches 118, 120 locks the shells 102, 104 of the assembled pipe guide 100 together. Each of the lock tongues 114, 116 is configured to be received under the 15 corresponding one of the catches 118, 120 when the shells 102, 104 are axially mated end-to-end. Each of the lock tongues, such as 114, has a radially outwardly projecting barb 114a (FIG. 2) formed on the outer end thereof. When the shells 102, 104 are mated the tongues 114, 116 deflect radially inwardly under their corresponding catches 118, 120 and once the barbs are axially past the catches 118, 120 they deflect radially outwardly and the barbs lock the shells 102, 104 together.

In each shell 102, 104, two of the vanes 103, 105 (FIG. 3) have recesses formed at their bases to receive the corresponding tab arms 110, 112 that are curved and extend circumferentially. Each tab arm 110, 112 is formed with a pair of parallel upstanding tabs such as 122 (FIG. 1) that slide over opposite sides of a corresponding vane. In each shell one of the vanes has a recess formed at its base for receiving a corresponding slide-lock 106, 108. The slide-locks 106, 108 each have a pair of parallel upstanding flanges such as 108a (FIG. 1) that slide over opposite sides of the corresponding vanes 103, 105. The pipe guide 100 is rapidly assembled by dropping the tab arms 110, 112 into the correct recesses in the vanes, dropping the slide-locks 106, 108 into the corresponding recesses in the vanes, rotationally aligning the two shells 102, 104, and sliding them together until the locking tongues 114, 116 engage and snap-lock under their respective circumferentially extending catches 118, 120. The pipe guide 100 need only be assembled once, and can be repeatedly installed or removed thereafter using the tab arms 110, 112 and slide-locks 106, 108.

Figure 2A:
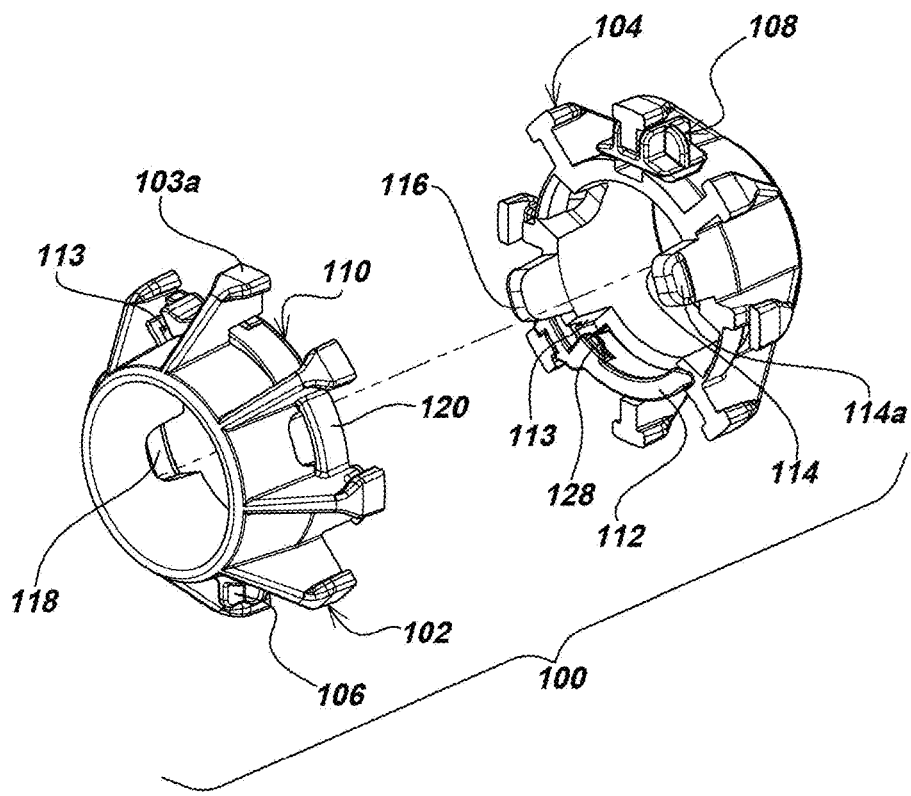
FIGS. 2A and 2B are exploded views of the components illustrated in FIG. 1 partially assembled into two mating halves.
Figure 2B:
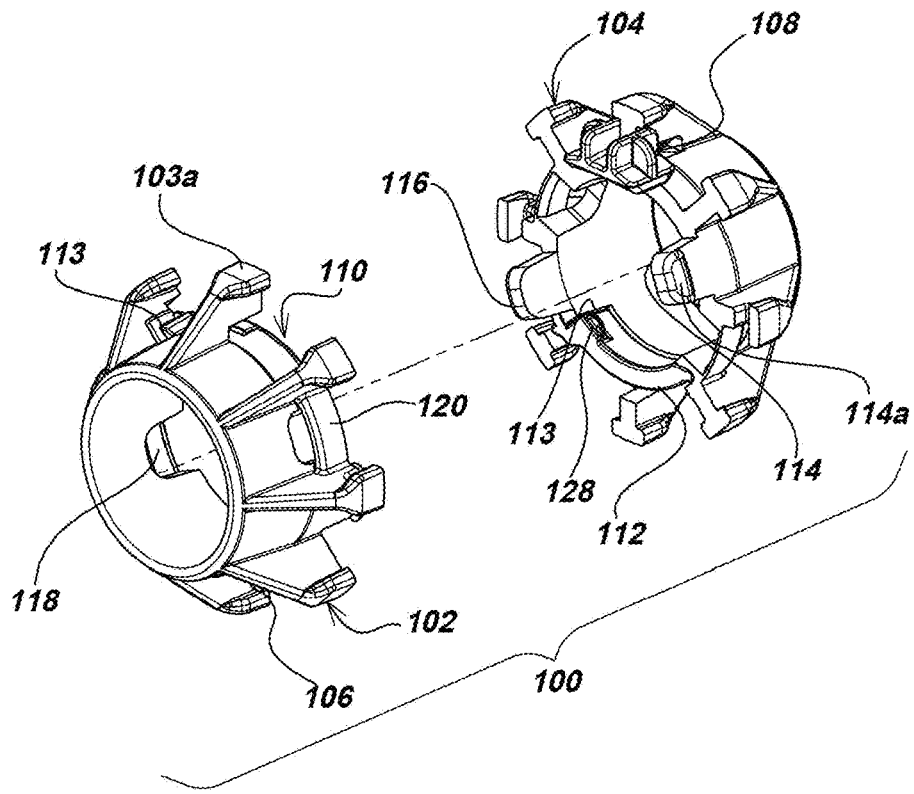
Figure 3:
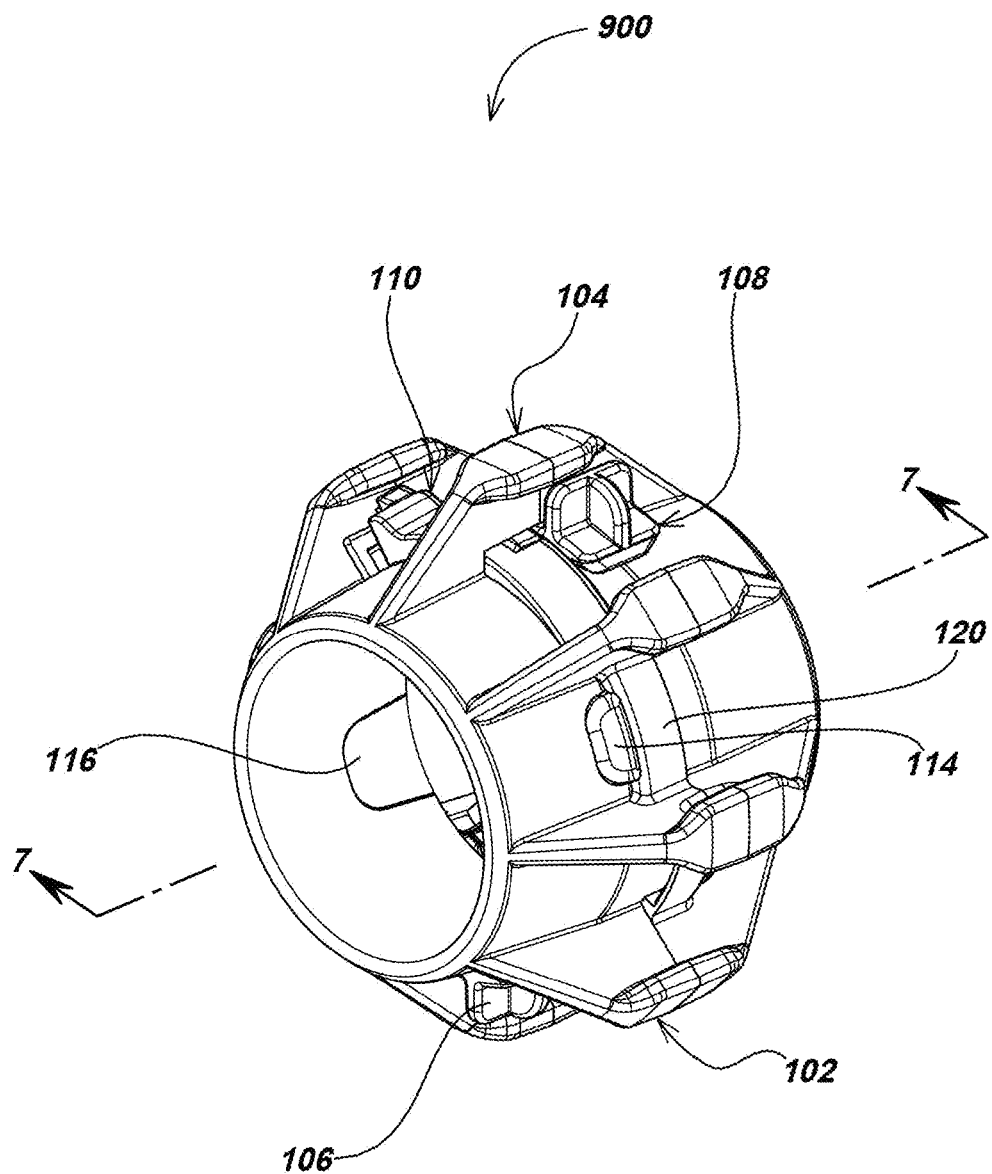
FIG. 3 is an enlarged isometric view of the assembled pipe guide of FIG. 1 in an unlocked configuration in which it may be slid into position around the spring of a pipe inspection system.
Figure 4:
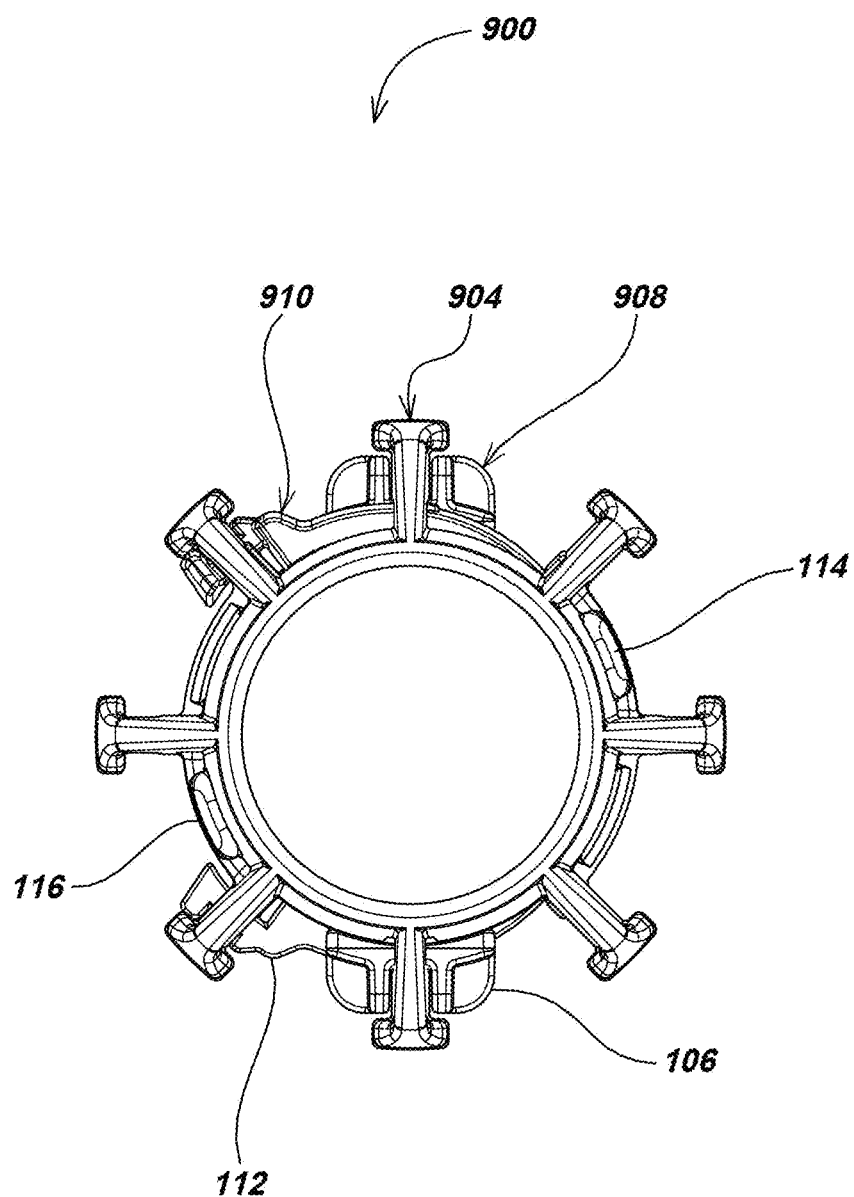
FIG. 4 is an end view of the assembled pipe guide taken from the left side of FIG. 3.

FIGS. 2A and 2B illustrate the two halves with the tab arms 110, 112 and the slide-locks 106, 108, inserted into the recesses 113 in their respective shells 102, 104, prior to locking the two halves together. The two locking tongues 114, 116 protrude from shell 104 aligned with matching catches 118, 120 in shell 102. The tongues on shell 102 are not visible in this view. The tabs on the tab arms 110, 112 lie to either side of one vane when the tab arm is seated in its corresponding shell. When the tab arms 110, 112 are in their downward or locked positions, pressing tabs 122, 124 (FIG. 6) formed on the extreme ends of the tab arms 110, 112 toward the intermediary vane will force the tab arm to shift upward (unlock) provided the slide-locks 106, 108 are in unlocked, i.e. not overlapping the tab arms 110, 112. In FIGS. 3 and 4, this would be a clockwise force on tab arm 110, for example. FIGS. 2A and 2B show the unlocked, and locked positions of slide-lock 108, respectively.

When a tab arm is in its unlocked, upper position, pressing the inner tab downward toward the central axis of the pipe guide 100 will force the tab arm to shift downward into its locking position. In FIG. 3 this would be a downward force on tab arm 110. The design of the tab arms 110, 112 causes these movements to occur with a positive click as the tab arm's wedge-shaped key passes up or down through its opening in the shell. The lower face of each tab arm 110, 112 has a small wedge-shaped key 126 and 128 (FIG. 6) formed into the same.

The slide-lock 108 in shell 104 is seated in a formed recess such that when the two shells 102, 104 are locked together, it will be able to slide axially over the flat surface of tab arm 110 if the tab arm is in its depressed position, thus locking the tab arm 110 into the depressed position. Slide-lock 106 can similarly slide axially over and lock down tab arm 112.

When a slide-lock 106, 108 is in position over a tab arm 110, 112, a small raised surface 130 (FIG. 1) on the tab arm 110 fits removably into a small indentation in the slide-lock, similar to indentation 132 on slide-lock 106. This alignment creates a friction interlock which holds slide-lock 108 onto tab arm 110, and slide-lock 106 onto tab arm 112. Thus the tab arms 110, 112 and slide-locks 106, 108 have cooperating projections and detents that snap together. When the assembled pipe guide 100 is in position on the spring of a pipe inspection system and the tab arm 110 is depressed, the formed key 126 of the tab arm 110 will axially lock the pipe guide 100 into position on the coil-spring 304 which supports the camera head 202 as illustrated in FIG. 9.

FIG. 3 illustrates the assembled pipe guide 100 with the two halves of shells 102, 104 mated and locked together. In this view the tab arm 110 is in the raised or open, unlocked position, allowing the pipe guide 100 to be slid into position at the end of the coil spring 304 just behind the camera head 202. When the pipe guide 100 is correctly positioned, the operator may lower the tab arms 110, 112 into their depressed, locked positions by pressing on the end tabs of tab arm 110, 112 until the keys 226 and 128 wedge between adjacent coils of the spring 304. Tab arm 110 is then locked down by sliding slide-lock 108 axially across it. The same process is done with tab arm 112 and slide-lock 106, locking the pipe guide 100 on both sides of the coil spring.

FIG. 4 illustrates an end view of the pipe guide 100 when in the unlocked or open condition. Tab arms 110, 112 can be seen to be slightly raised from the outer surface of the cylindrical portions 107, 109 and the inner wall of the pipe guide 100 is uninterrupted by any protuberance. In this configuration, the pipe guide 100 is able to readily slide into position over the coil spring 100. It can also be seen in FIG. 4 that in the open position the raised tab arms 110, 112 prevent the slide-locks 106, 108 from moving over them.

Figure 5:
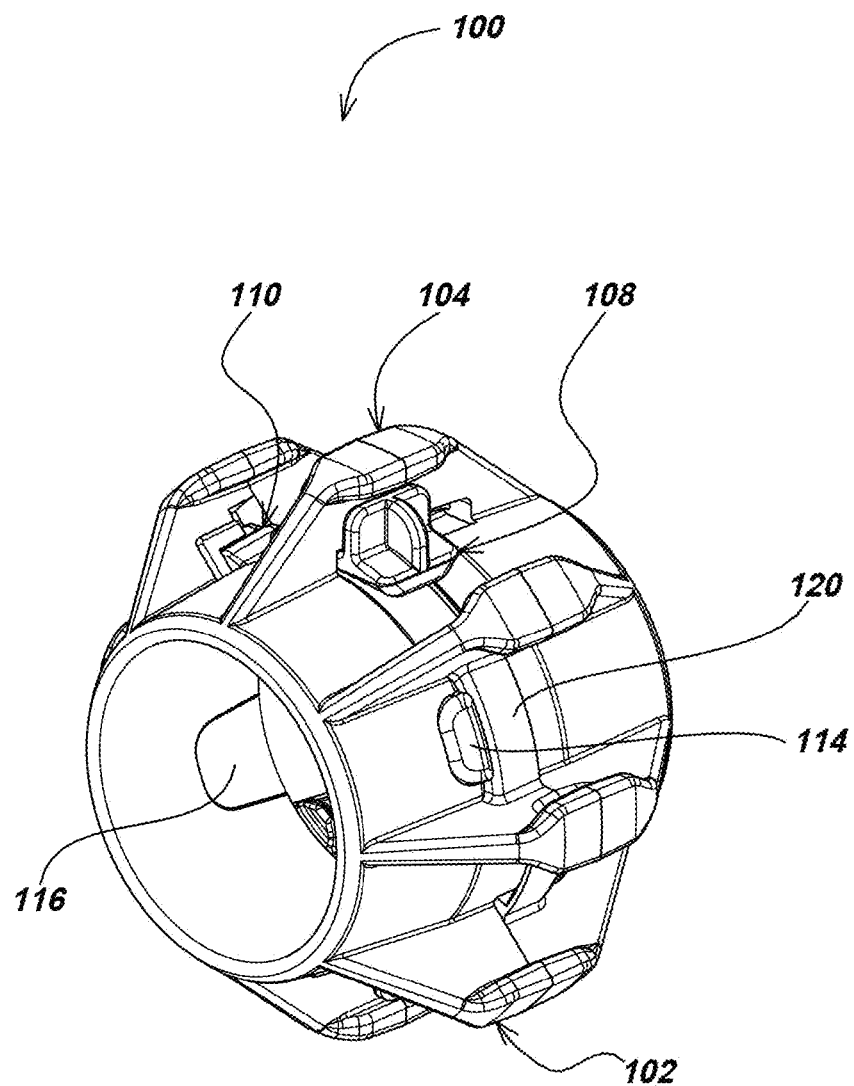
FIG. 5 is an isometric view of the assembled pipe guide of FIG. 1 in a locked configuration.

FIG. 5 is a perspective view of the pipe guide 100 with the tab arm 110 in its lowered or locking position. Slide lock 108 has been slid over the lowered tab arm 110 thus preventing it from working open in use. In this view the connection between the halves of the shell 102, 104 by reason of locking tongues 114 and 116 locking under the catches such as 120 can be clearly seen.

Figure 6:
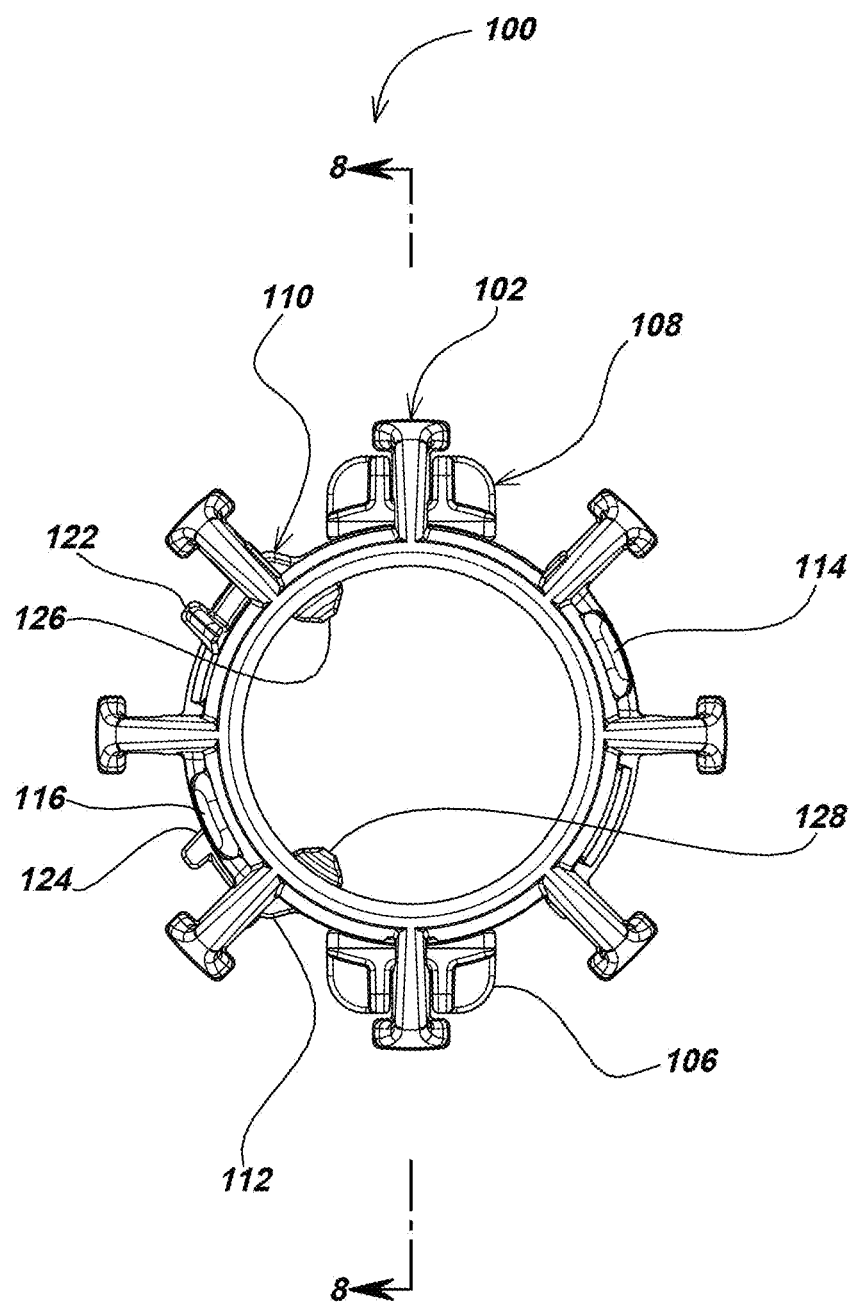
FIG. 6 shows an end view similar to FIG. 4 illustrating the pipe guide in a locked configuration.

FIG. 6 is an end view of the pipe guide 100 when in its locked configuration. Here, the wedge-like keys 126, 128 formed in the undersides of tab arms 110 and 112 can be seen protruding inside the inner circumference of the pipe guide 100. Tab 122 on tab arm 110 and tab 124 on tab arm 112 have been pressed away from their respective dividing vanes causing the tab arms 110, 112 to shift downward and inserting the keys 126, 128 into the interior of the pipe guide. When the pipe guide 100 surrounds the coil spring 304 the keys 126, 128 are inserted between adjacent coils of the spring 304 to lock the pipe guide 100 longitudinally directly rearward of the camera head 202 in the proper position for supporting and guiding the same.

Figure 7:
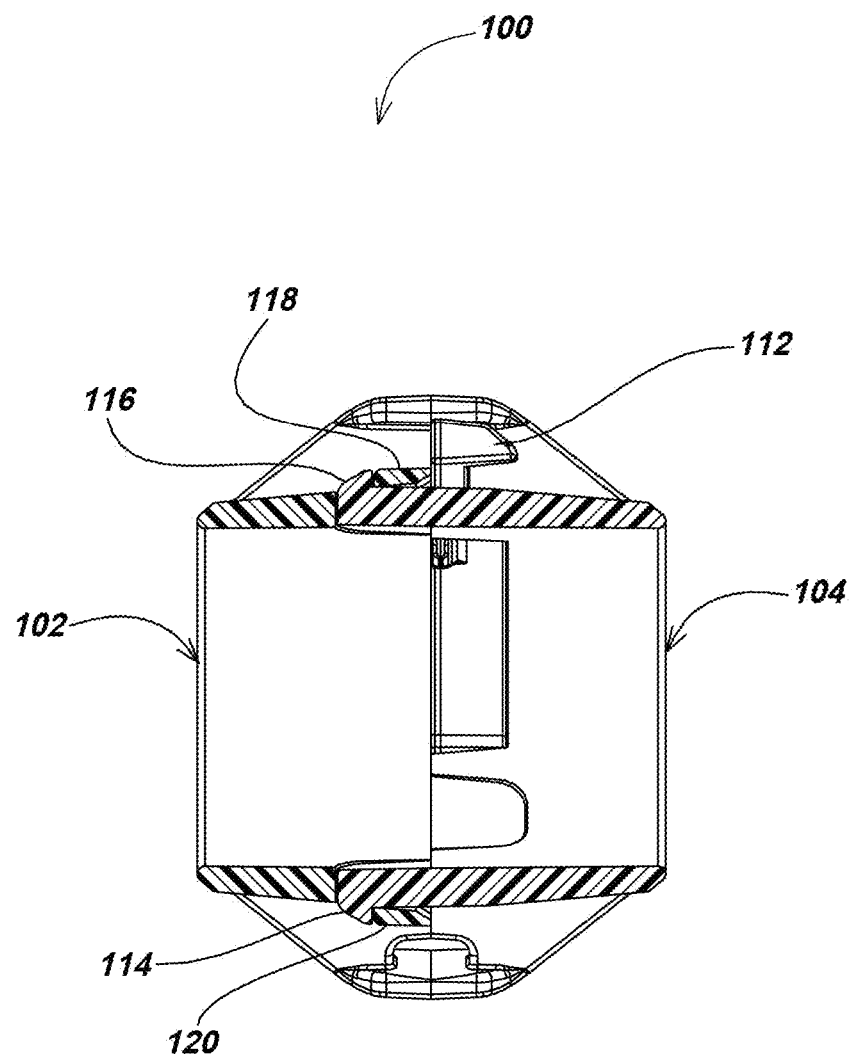
FIG. 7 is a sectional view of an assembled pipe guide taken along line 7-7 of FIG. 3.

FIG. 7 is a sectional view illustrating the locking action of tongues 114, 116 under the catches 118, 120. The curved forward edge of the tongue 114, 116 forces the edge of the catches 118, 120 upward until the projecting barbs on the leading edges of the tongues 114, 116 passes the raised edge, allowing it to snap down and lock the tongues 114, 116 in place. The locking of two tongues 114, 116 under their respective catches 118 120 on each shell 102, 104 holds the two halves of pipe guide 100 together.

Figure 8:
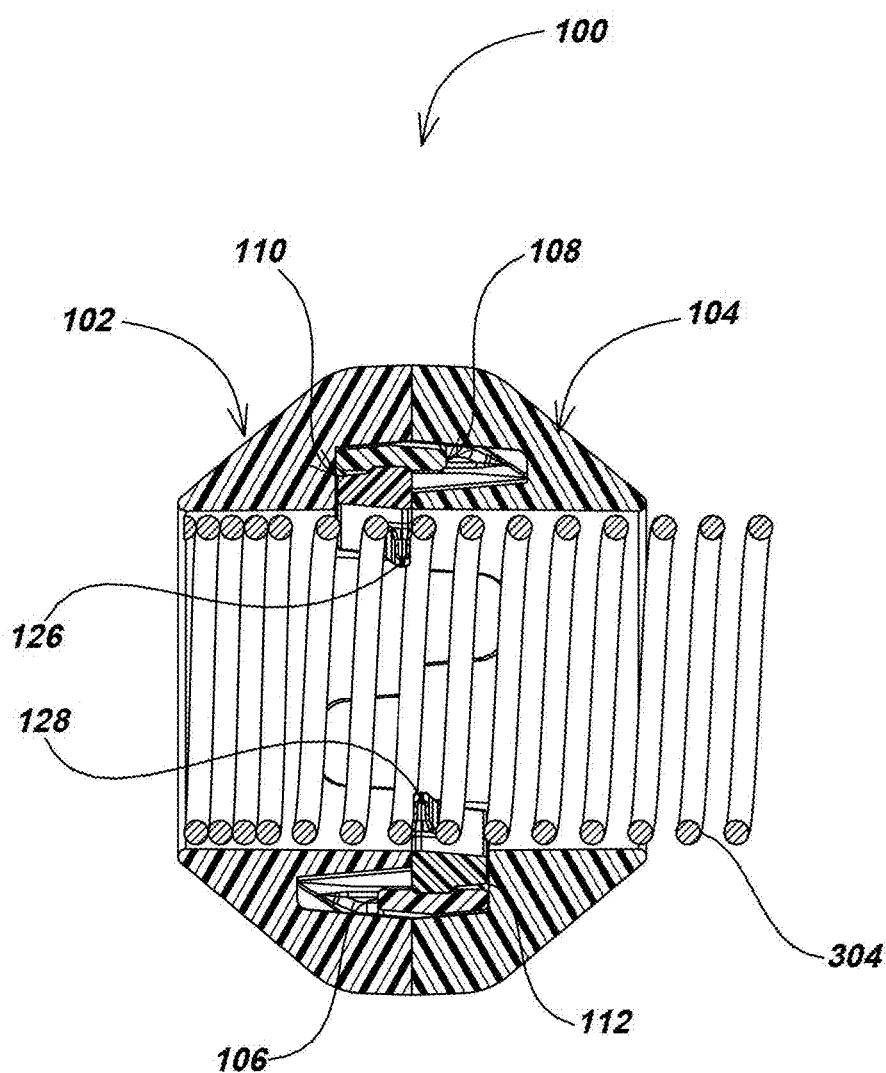
FIG. 8 is a sectional view taken along line 8-8 of FIG. 6 and illustrating the pipe guide locked into position around the coil spring of a pipe inspection system.

FIG. 8 is a cutaway view of pipe guide 100 locked into position around the coil spring 304. The wedge-shaped keys 126 and 128 are seen wedged between individual coils of the spring. Key 126 is an extension of tab arm 110 which is in turn locked into its depressed position by slide-lock 108. Key 128 is an extension of tab arm 112 which is in turn locked into its depressed position by slide-lock 106.

Figure 9A:
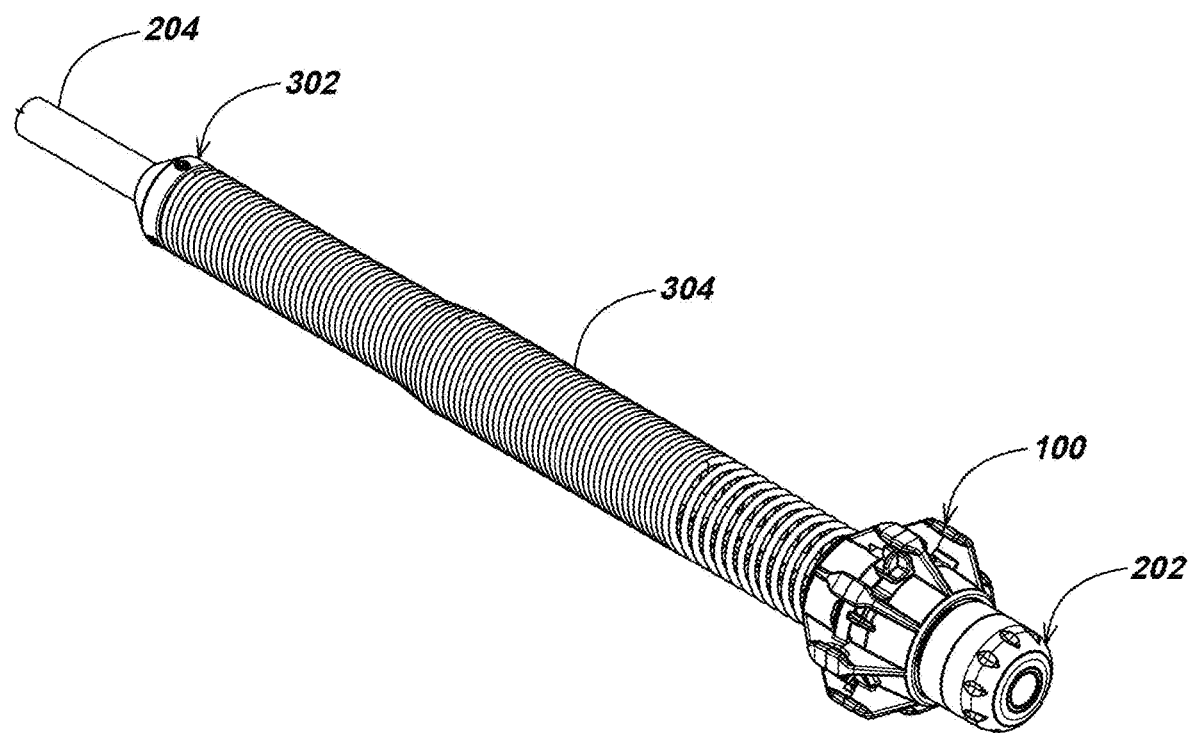
FIG. 9A is a reduced isometric view of the pipe guide of FIG. 1 locked in position around a spring 304 attached to a push-cable 204 of a pipe inspection system rearward of its camera head.
Figure 9B:
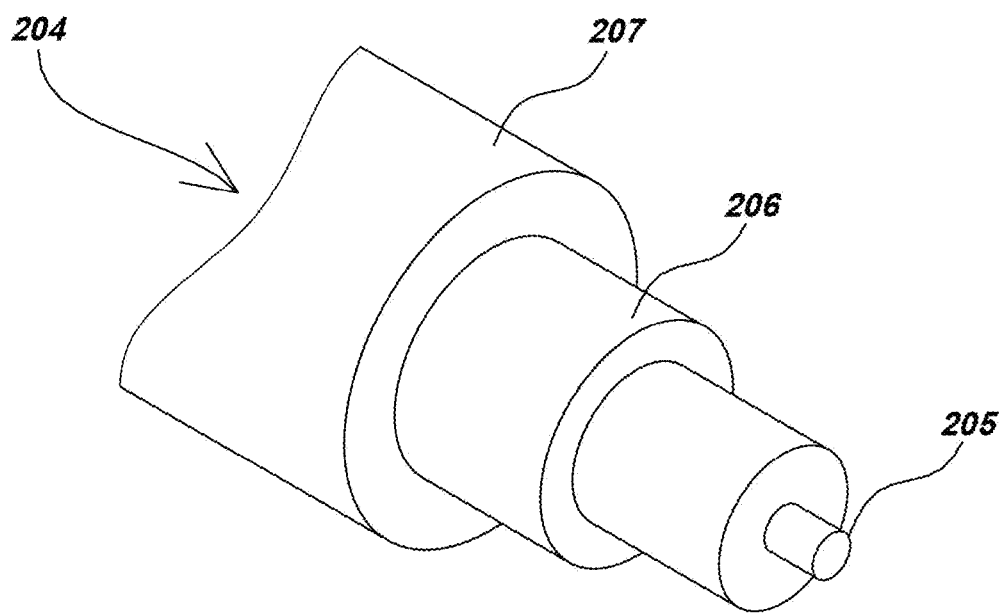
FIG. 9B shows examples of push-cable 204 components.

FIG. 9A illustrates the assembled pipe guide 100 in place and locked in position around the spring 304 of a typical video pipe inspection system. In FIG. 9, pipe guide 100 is seen placed immediately behind the camera head 202 at the distal end of the coil spring 304. The coil spring 304 is attached to a push-cable 204 by a termination adapter 302. Each of the tab arms 110, 112 in pipe guide 100 is locked in its depressed or locked position, causing the associated keys 126, 128 to wedge between the spring coils below, thus firmly fixing the pipe guide 100 in position. FIG. 9B illustrates examples of components of push-cable 204 which may include a central core including at least one conductor 205, a plurality of non-metallic resilient flexible stiffness members surrounding the core 206, and a layer of sheathing surrounding the stiffness members 207.

Figure 10:
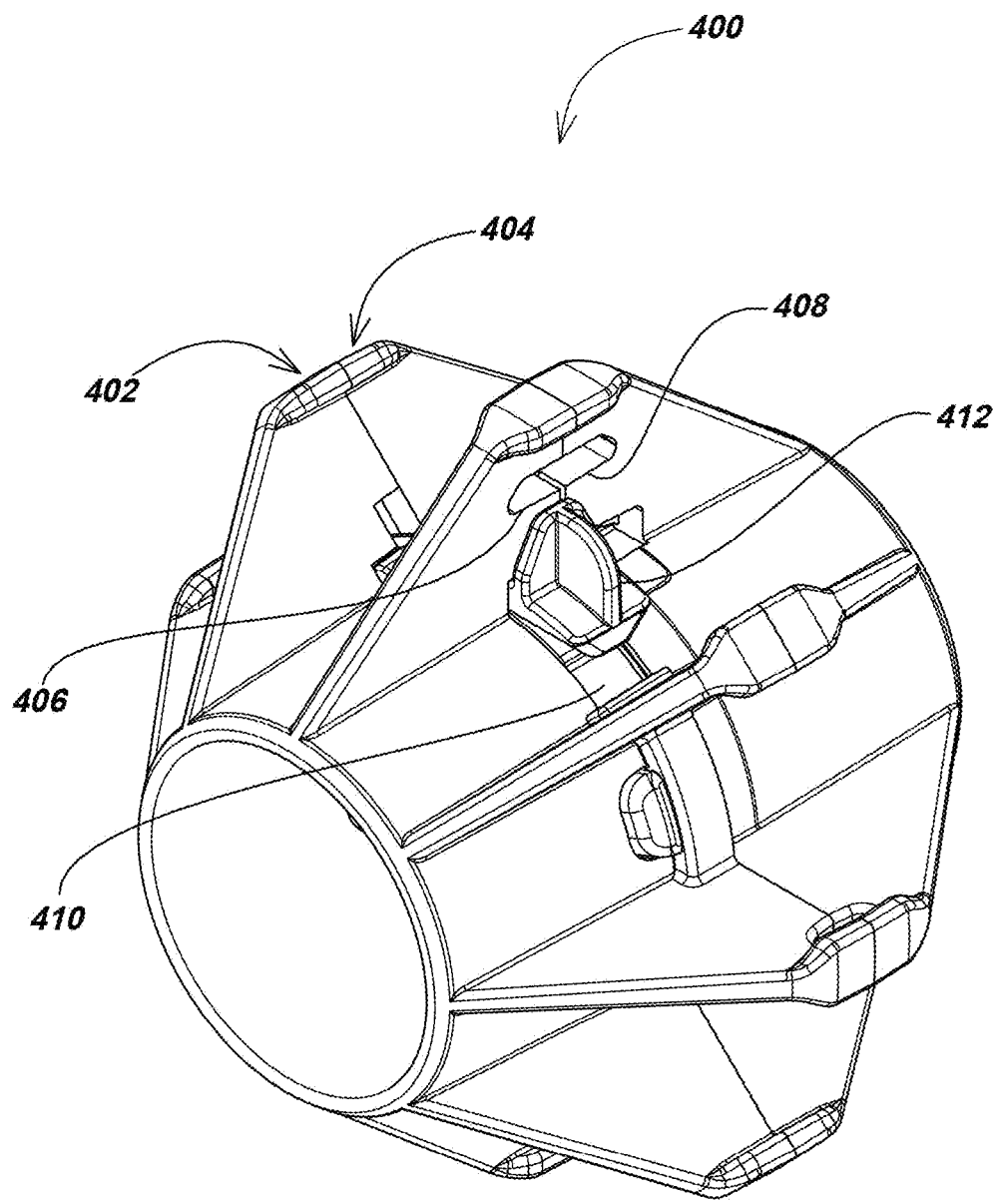
FIG. 10 is an enlarged isometric view of an alternate embodiment of a pipe guide of that incorporates an alternative vane design.

An alternate embodiment of the present invention is illustrated in FIG. 10. In assembly 400, the two shell halves 402, 404 each have a slot 406, 408 formed in the vane above each slide-lock recess. When assembled the two slots form a single slot above the slide-lock 412 parallel to the channel in which the slide-lock 412 moves when it is slid into locking position over the locked tab arm 410. The presence of the slots 406, 408 provides a degree of spring-like flexure in the portion of the vane below the slot which enables the slide-lock 412 to be pressed downward when it is in position over the tab arm 410. This flexure also provides a positive locking force to reinforce the locking action of the slide-lock 412 and prevent accidental displacement of the slide-lock.

Clearly, other adaptations and modifications of the present invention will occur to those skilled in the art in view of the teachings set forth above. The pipe guide may be scaled to a larger diameter for larger video pipe inspection systems. More locking tabs may be designed into a larger version, and the precise form of the shells used to form the pipe guide may be adapted for other systems as needed. The vanes could be replaced with other forms of pipe centering and stand-off means such as flexible brush bristles, spokes and cuffs. Therefore, the protection afforded the present invention should only be limited by the following claims and their equivalents, which include all such embodiments and modifications when viewed in conjunction with the above specification and accompanying drawings.

We claim:

1. A video pipe inspection system, comprising:
a push-cable, including:
a central core including at least one conductor;
a plurality of non-metallic resilient flexible stiffness members surrounding the core;
a layer of sheathing surrounding the stiffness members;
a camera head operatively coupled at a distal end of the push-cable to generate video signals for coupling to the at least one conductor; and
a pipe guide, wherein the pipe guide comprises a first cylindrical shell and a second cylindrical shell, each of the cylindrical shells including a plurality of tab arms, one or more catches, and one or more lock tongues comprising one or more barbs on the edges of the one or more tongues for snapping down and locking the tongues in place, wherein the one or more catches of each cylindrical shell provide one or more recesses for receiving and engaging the one or more barbs of the lock tongues extending from the other cylindrical shell to removably snap together the cylindrical shells.

2. The video pipe inspection system of claim 1, further comprising a coil spring surrounding the distal end of the push-cable and having one end connected to the camera head.

3. The video pipe inspection system of claim 2, further comprising a plurality of vanes extending radially from each of the cylindrical shells, the plurality of vanes each including one or more recesses formed at a base portion to receive corresponding tab arms, at least one tab arm of the plurality of tab arms mounted on each of the cylindrical shells having a key portion that is movable radially inwardly to a locked position to anchor the cylindrical shells to the coil spring, and a pair of slide lock mechanisms to move the key portion of at least one tab arm of the plurality of tab arms to a locked position and to an open position.

4. The video pipe inspection system of claim 3, wherein a portion of each of the slide-locks mechanisms is deflected radially inwardly to lock to the coil spring as the slide-locks are slid axially over a corresponding tab arm.

5. The video pipe inspection system of claim 3, wherein the vanes each have tapered frontal edges.

6. The video pipe inspection system of claim 1, wherein at least one tab arm of the plurality of tab arms includes a corresponding key portion, and the corresponding key portion of the at least one tab arm of the plurality of tab arms extends radially through corresponding openings in the shells.

7. The video pipe inspection system of claim 3, wherein at least one tab arm of the plurality of tab arms includes one or more tabs to lock or unlock the pipe guide to the coil spring.

8. The video pipe inspection system of claim 1, wherein the camera head comprises a front end for imaging and a rear end operatively connected to the distal end of the push-cable.

9. The video pipe inspection system of claim 1, wherein the resilient flexible stiffness members comprise fiberglass or carbon fiber.

10. The video pipe inspection system of claim 3, wherein the vanes each have skids on an outer end for engaging an interior wall of a pipe.

11. The video pipe inspection system of claim 1, wherein the shells are rotationally aligned and slide together until the locking tongues of one shell engage and snap-lock under corresponding catches of another shell.

12. A pipe inspection system, comprising:
a push-cable;
a camera head operatively connected to a distal end of the push-cable;
a coil spring surrounding the distal end of the push-cable and having one end connected to the camera head; and
a pipe guide, comprising:
a first cylindrical shell and a second cylindrical shell, each of the cylindrical shells including a plurality of tab arms, one or more catches, and one or more lock tongues comprising one or more barbs on the edges of the one or more tongues for snapping down and locking the tongues in place, wherein the one or more catches of each cylindrical shell provide one or more recesses for receiving and engaging the one or more barbs of the lock tongues extending from the other cylindrical shell to removably snap together the cylindrical shells.

* * * * *